United States Patent
Haynes et al.

(10) Patent No.: US 12,372,436 B1
(45) Date of Patent: Jul. 29, 2025

(54) ROTATIONAL TEST APPARATUS AND METHODS

(71) Applicant: Stress Engineering Services, Inc., Mason, OH (US)

(72) Inventors: Clinton A. Haynes, Mason, OH (US); Shannon R. Read, Lebanon, OH (US); Michael William Landgraf, Loveland, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

(21) Appl. No.: 19/007,993

(22) Filed: Jan. 2, 2025

Related U.S. Application Data

(60) Provisional application No. 63/623,445, filed on Jan. 22, 2024.

(51) Int. Cl.
*G01M 99/00* (2011.01)

(52) U.S. Cl.
CPC ................................. *G01M 99/007* (2013.01)

(58) Field of Classification Search
CPC ................................. G01M 99/007; G01N 3/56
See application file for complete search history.

(56) References Cited

U.S. PATENT DOCUMENTS

| | | | |
|---|---|---|---|
| 2,180,608 A | 11/1939 | Pooler | |
| 3,142,978 A | 8/1964 | Klass | |
| 4,583,392 A * | 4/1986 | Holmgren | G01M 99/001 73/12.04 |
| 2013/0327120 A1* | 12/2013 | Chang | G01N 3/56 73/7 |

FOREIGN PATENT DOCUMENTS

CN 211652011 U 10/2020

OTHER PUBLICATIONS

Nelva-Pasqual, F.; Partial European Search Report, dated Jun. 25, 2025; EP Pat. App. No.: 25152905.3; 11 pages.

* cited by examiner

*Primary Examiner* — Natalie Huls
(74) *Attorney, Agent, or Firm* — Frost Brown Todd LLP

(57) ABSTRACT

A rotational test apparatus includes a support assembly, a plurality of bolts, an obstacle, and a drum. The drum is rotatably supported by the support assembly and includes a first end wall, a second end wall, and a side wall which cooperate to define an interior compartment. The first end wall defines a passageway which extends into the interior compartment and is sized to facilitate selective insertion and removal of packages therethrough. The side wall defines a plurality of threaded apertures including a first plurality which is occupied by said bolts and a second plurality which is unoccupied. The second plurality exceeds the first plurality by at least a ratio of 10 to 1. The obstacle is secured to the side wall within the interior compartment by at least some of said bolts threaded into respective ones of the first plurality of the threaded apertures. Methods are also provided.

12 Claims, 8 Drawing Sheets

ROTATIONAL TEST APPARATUS AND METHODS

REFERENCE TO RELATED APPLICATION

This application claims priority of U.S. provisional patent application Ser. No. 63/623,445 filed Jan. 22, 2024, and hereby incorporates this provisional patent application by reference herein in its entirety.

TECHNICAL FIELD

The rotational test apparatus and methods described herein can facilitate effective simulation of actual loading profiles upon proposed packages, without requiring the proposed packages to be conveyed through a warehouse or parcel fulfillment handling operations.

BACKGROUND

Conventional methods of testing proposed packages require actual conveyance of the proposed packages through a warehouse. Requiring access to a warehouse in this manner can impose inefficiency upon both the operation of the warehouse and the process of selecting and designing the configuration of the proposed packages.

SUMMARY

In accordance with one embodiment, a rotational test apparatus comprises a support assembly, a plurality of bolts, a first obstacle, and a drum. The drum is rotatably supported by the support assembly. The drum comprises a first end wall, a second end wall, and a side wall. The first end wall defines a first passageway. The side wall defines a plurality of threaded apertures. A first plurality of the threaded apertures is occupied by said bolts. A second plurality of the threaded apertures is unoccupied. The second plurality exceeds the first plurality by at least a ratio of 10 to 1. The first end wall, the second end wall and the side wall cooperate to define an interior compartment. The first passageway extends into the interior compartment and is sized to facilitate selective insertion and removal of packages therethrough. The first obstacle is disposed within the interior compartment and secured to the side wall with at least some of said bolts threaded into respective ones of the first plurality of the threaded apertures.

In accordance with another embodiment, a method comprises determining an actual loading profile. The determining comprises fitting a test package with at least one sensor and a data acquisition unit coupled with said sensor. The determining further comprises conveying the test package through a warehouse and detecting with said sensor dynamic loading experienced by the test package during the conveying of the test package through the warehouse. The determining additionally comprises capturing data with the data acquisition unit corresponding with the detecting by said sensor. The determining also comprises interpreting the data to identify the actual loading profile. The method also comprises operating a rotational test apparatus. The operating comprises securing at least one obstacle within an interior compartment defined by a drum of the rotational test apparatus. The operating comprises inserting a proposed package into the interior compartment and rotating the drum at a speed. The speed of the rotating of the drum and a quantity, size, and location of each said obstacle are selected such that the rotational test apparatus imparts a simulated loading profile onto the proposed package. The simulated loading profile approximates the actual loading profile.

BRIEF DESCRIPTION OF THE DRAWINGS

It is believed that certain embodiments will be better understood from the following description taken in conjunction with the accompanying drawings in which.

DETAILED DESCRIPTION

Figure 1:
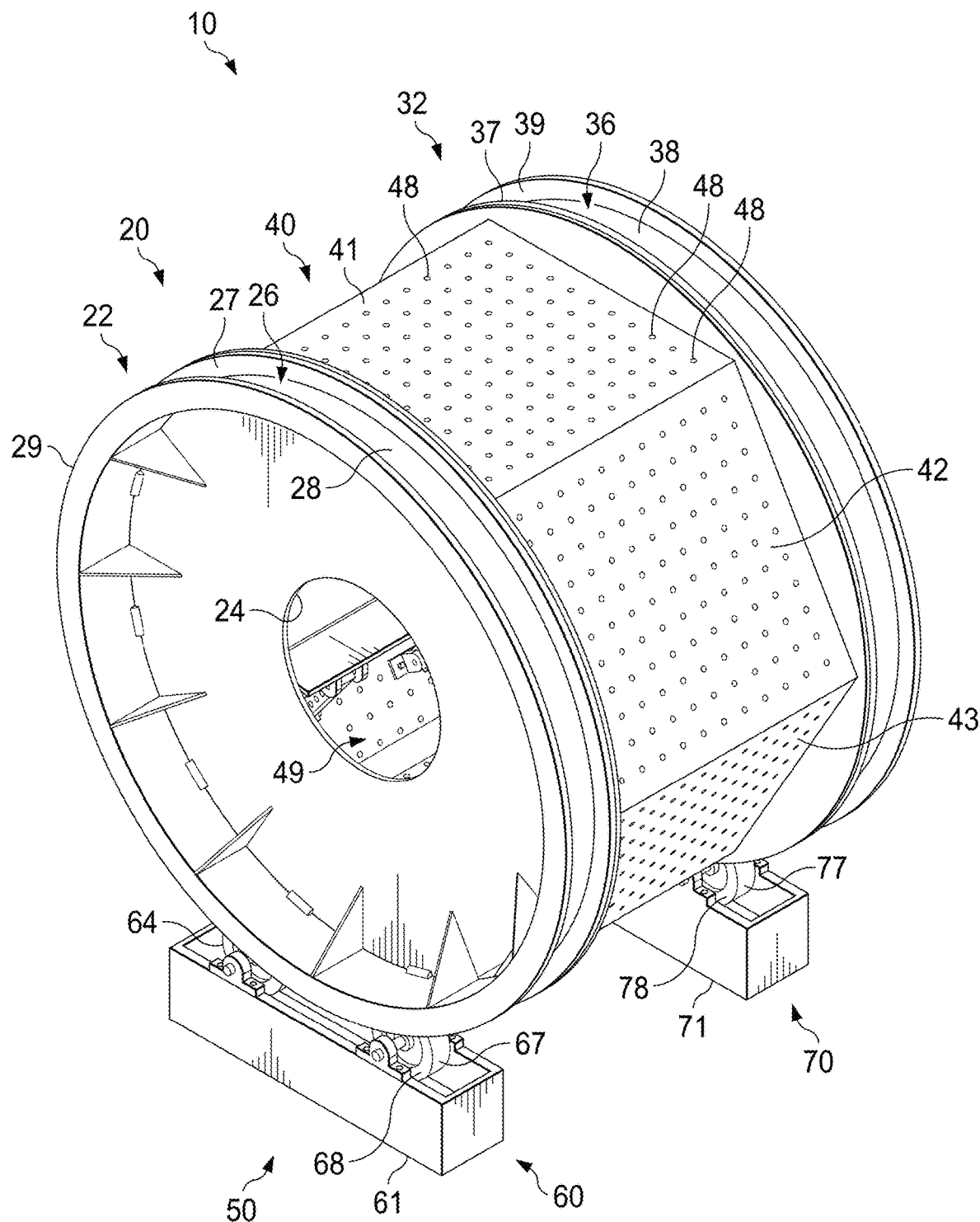
FIG. 1 is a perspective view depicting a rotational test apparatus in accordance with one embodiment.

Various non-limiting embodiments of the present disclosure will now be described to provide an overall understanding of the principles of the structure, function, and use of the apparatus and methods disclosed. One or more examples of these non-limiting embodiments are illustrated in the selected examples disclosed and described with reference made to FIGS. 1-7 in the accompanying drawings, wherein like numbers indicate the same or corresponding elements throughout the views. Those of ordinary skill in the art will understand that apparatus and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The examples discussed herein are examples only and are provided to assist in the explanation of the apparatus and methods described herein. None of the features or components shown in the drawings or discussed below should be taken as mandatory for any specific implementation of any of these apparatus and methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatus, devices, systems, methods, etc. can be made and may be desired for a specific application. Also, for any methods described, regardless of whether the method is described in conjunction with a series of steps or a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and include a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the apparatus and methods described herein can be applied to, or easily modified for use with, other types of equipment, can use other arrangements of computing systems, and can use other protocols, or operate at other layers in communication protocol stacks, than are described.

As described in more detail below, the present disclosure generally relates to rotational test apparatus and methods, selected embodiments of which are hereinafter described in connection with the views and examples of FIGS. 1-7. A rotational test apparatus and method as described herein can be used to facilitate lab testing of various packaging configurations in a manner that closely replicates real-life conditions that the package is likely or expected to encounter, in particular for example within a warehouse or other large scale, automated fulfillment environment (collectively referred to as a "warehouse" herein). Through use of such an apparatus and methods, effective and accurate testing of packages can be reliably accomplished in a lab setting, and namely without need for conveying of packages through a warehouse to determine the effectiveness of the packaging to protect the products therein contained.

Most conveying systems used in large fulfillment centers or other forms of large warehousing facilities are planar/rectilinear. That is, they operate more-or-less in a plane parallel to the floor until a transition in elevation is needed. For the purposes of this discussion, there are generally just a few common ways for a package to make elevation changes within such a facility. For example, an elevation change can occur over a long distance through use of a conveyor operating at an ascending or descending angle. These long-distance elevation transitions generally do not impart any notable dynamic loading of significance upon the package being conveyed. Spiral chutes are another common implement to facilitate elevation change in fulfillment centers and large conveyance systems and can facilitate significant elevation change over a small amount of space. If a package is of such a size that it has a propensity to tumble rather than slide, which is often the case, the dynamic loading experienced by the package can be significant during its travel along a spiral chute. There are also additional transitions in a warehouse that can result in dynamic loading to a package. Some of these transitions can occur over small distances where even minor elevation changes made abruptly can result in bouncing of the package, such as for example when a package passes through a sorter of some type (e.g., a finger sorter). These transitions and associated dynamic loading also commonly occur in conveyor systems where a direction change occurs or in movement of a package between associated conveyor systems.

When selecting the manner of packaging for a particular product, acceptability of co-packaging a product with other products, and dunnage to be used within a package, it is typical to take into account the expected real-life conditions that the associated package is likely or expected to encounter. It can be desirable to closely match these parameters to the extent possible. This way, the product(s) is/are adequately packaged to reduce probability of damage during shipment yet are not significantly overpackaged to result in needless waste of packaging or dunnage materials.

To facilitate this, a first step can comprise determining what real-life conditions for the package are expected or likely to be. The forces experienced by a particular package can depend in part upon the characteristic profile of the package which can include the size, shape, weight, weight distribution, and other characteristics of the package. A primary cause of damage to packages is dynamic loading, and most instances of dynamic loading can be incurred as a package travels through a warehouse. Therefore, to accomplish this first step for a particular package, dynamic loading can be measured as a test package passes through the warehouse. More particularly, the test package can be fitted with a data acquisition unit having one or more accelerometers and inertial measurement units (IMUs) and/or other sensors which can measure dynamic loading, position and orientation as well as other parameters experienced by the test package as it passes through the warehouse. For example, a triaxial accelerometer arrangement can facilitate measurement of dynamic loads in three directions, and an IMU can facilitate detection of package rotation and orientation. Dynamic events measured with accelerometers can be correlated with FVIU data to determine position and orientation of the test package at the time of each dynamic event. Processes and software can facilitate automatic and accelerated processing, interpretation and visualization of this data, taking into account monitoring for acceleration, orientation and elevation during the conveyance of the test package through the warehouse.

The resultant data can be associated with the characteristic profile of the test package itself as well as the warehouse environment. For the warehouse environment, the data acts as or contributes to a signature or fingerprint that characterizes the dynamic nature of the equipment upon which packages are transported. In addition, relative to the packages, forces can be predicted for future packages having a similar characteristic profile. This procedure can be completed several times with different test packages, so as to produce a collection of force datasets associated with respective characteristic profiles thereof for a given warehouse. However, given the thousands of available characteristic profiles that a package can assume, it would not be economically or practically feasible to fit packages of each characteristic profile with inertial measurement units (IMUs) and/or other sensors and then introduce them to the warehouse. Or put another way, if a package having a new characteristic profile is developed or if it is desired to perform specific testing on a particular package, it would be far preferable to be able to reliably do that in a laboratory setting than in the warehouse itself.

Accordingly, in a second step of the disclosed method, and as will be described in further detail below, the data measured in the first step can be used as the basis to construct and calibrate a test apparatus to allow for testing of packages in a lab setting. More particularly, the test apparatus can be configured such that packages can experience a similar force profile as they would experience if passing through the warehouse. In one embodiment, such a test apparatus can comprise a rotational test apparatus having a rotatable drum.

A first example of a rotational test apparatus 10 will accordingly be described with reference to FIGS. 1-4. The rotational test apparatus 10 is shown to comprise a drum 20 having a first end wall 22, a second end wall 32 and a side wall 40. The first end wall 22 and the second end wall 32 are shown to be spaced from one another and generally parallel with one another. In the example of FIGS. 1-4, the side wall 40 is shown to include a plurality of side wall sections 41, 42, 43, 44, 45 and 46. Each of the side wall sections 41, 42, 43, 44, 45 and 46 is shown to be generally planar, extend from the first end wall 22 to the second end wall 32, and abut adjacent ones of the side wall sections 41, 42, 43, 44, 45 and 46 to define a hexagonal shape of the side wall 40. In one embodiment, each of the side wall sections 41, 42, 43, 44, 45 and 46 can be identical to all other ones of the side wall sections 41, 42, 43, 44, 45 and 46 and can each be formed, for example, from a flat sheet of ¼" steel plate material. However, it will be appreciated that any of a variety of other suitable materials and configurations can alternatively be used to form a side wall or respective members thereof. Adjacent ones of the side wall sections 41, 42, 43, 44, 45 and 46 can be welded to one another at each of the points of abutment thereof. Further, each of the side wall sections 41, 42, 43, 44, 45 and 46 can be welded to each of the first end wall 22 and the second end wall 32. However, it will be appreciated that, in addition to or in lieu of welding, one can additionally or alternatively employ fasteners and/or any of a variety of other suitable techniques to facilitate coupling together of respective side wall sections and/or of a side wall to respective end walls of a drum. In one embodiment, a curvature can be provided at points of abutment between respective side wall sections in order to reduce or eliminate unintended potential impact points for a package within the interior compartment. Such a curvature can be accomplished, for example, by employing side wall sections that have a non-flat shape at least at their ends. Alternatively, such a curvature can be accomplished by installation (e.g., welding) of a transition panel within the interior compartment to bridge between portions of respective side wall sections adjacent to their attachment, wherein the transition member can in one embodiment span a full width of the interior compartment between the end walls.

In the example of FIGS. 1-4, the side wall 40 is shown to include a plurality of threaded apertures 48. In particular, and as shown in the example of FIGS. 1-4, each of the side wall sections 41, 42, 43, 44, 45 and 46 can include a plurality of threaded apertures 48. The threaded apertures 48 can be predrilled and tapped such that they can receive correspondingly threaded bolts. The threaded apertures 48 can be generally evenly spaced relative to one another, and each of the side wall sections 41, 42, 43, 44, 45 and 46 can be similar or identical to all of the other ones of the side wall sections 41, 42, 43, 44, 45 and 46.

Figure 2:
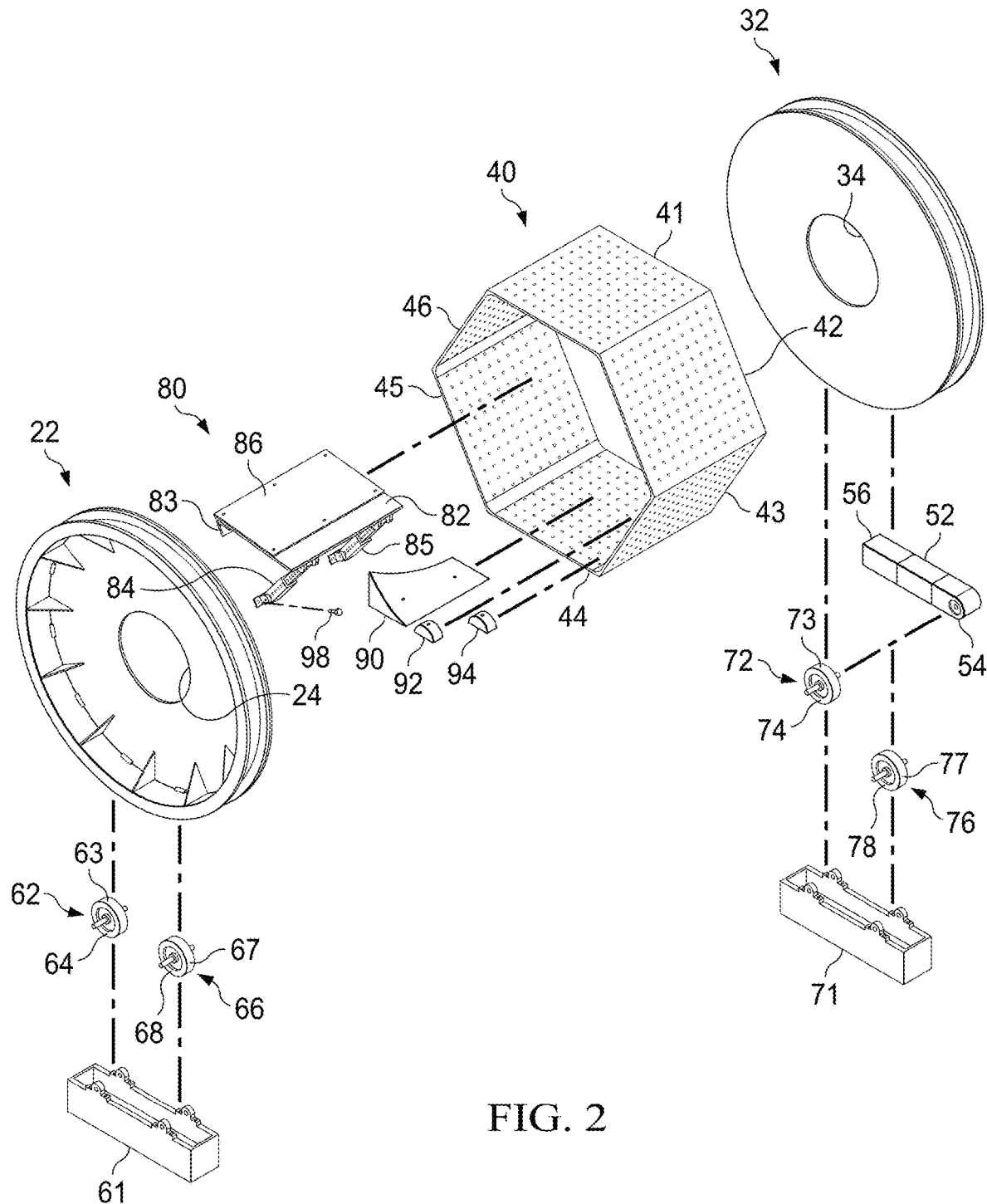
FIG. 2 is a partially exploded perspective view depicting the rotational test apparatus of FIG. 1.

The first end wall 22 is shown to define a passageway 24 extending into an interior compartment 49 defined by cooperation of the first end wall 22, the second end wall 32 and the side wall 40. The passageway 24 can be sized to facilitate selective insertion and removal of packages therethrough. Accordingly, packages can be selectively inserted into or removed from the interior compartment 49 through the passageway 24. The second end wall 32 is shown in FIG. 2 to define a similar passageway 34. While in the illustrated embodiment, the passageway 34 is shown to be similar to the passageway 24 and can facilitate a similar function, it will be appreciated that in other embodiments, passageways defined by respective end walls of a drum might not be similarly sized or configured. Further, in yet another alternative embodiment, a drum might only include a single passageway (e.g., 24 or 34).

The first end wall 22 is shown to comprise a first channel 26 defining first ridges 27 and 29 and a first bearing surface 28, each extending along an exterior of the drum 20 adjacent to an outermost perimeter of the first end wall 22. Each of the first ridges 27 and 29 can be adjacent to and generally perpendicular to the first bearing surface 28, as will be appreciated with reference to FIGS. 1-4. Likewise, the second end wall 32 is shown to comprise a second channel 36 defining second ridges 37 and 39 and a second bearing surface 38, each extending along an exterior of the drum 20 adjacent to an outermost perimeter of the second end wall 32. Each of the second ridges 37 and 39 can be adjacent to and generally perpendicular to the second bearing surface 38, as will be appreciated with reference to FIGS. 1-4. Each of the first and second bearing surfaces 28 and 38 can be generally curvilinear and, in the example of FIGS. 1-4, can define a circular shape extending along an exterior of the drum 20. In one embodiment, and in the example of FIGS. 1-4, the circular shapes of the respective first and second bearing surfaces 28 and 38 can have the same radius. However, in alternative embodiments, circular shapes of respective first and second bearing surfaces of a drum can have differing radii.

The rotational test apparatus 10 is shown further to comprise a support assembly 50 having a first support assembly portion 60 and a second support assembly portion

70. The first support assembly portion 60 is shown to include a first plurality of rotatable wheels, namely wheels 62 and 66, which are each rotatably supported with respect to a first frame 61. Likewise, the second support assembly portion 70 is shown to include a second plurality of rotatable wheels, namely wheels 72 and 76, which are each rotatably supported with respect to a second frame 71. In use of the rotational test apparatus, each of the first frame 61 and the second frame 71 can rest upon and/or be anchored to a ground surface.

The drum 20 can be rotatably supported by the support assembly 50 as will be appreciated with reference to FIGS. 1-4. In particular, each of the wheels 62 and 66 of the first support assembly portion 60 can contact the first bearing surface 28 of the channel 26 of the first end wall 22. Likewise, each of the wheels 72 and 76 of the second support assembly portion 70 can contact the second bearing surface 38 of the channel 36 of the second end wall 32. The support assembly 50 can accordingly allow the drum 20 to be rotated in contact with the wheels 62, 66, 72 and 76 and relative to a ground surface.

In one embodiment, as shown in the example of FIGS. 1-4, each of the first and second bearing surfaces 28 and 38 can be provided by the respective channels 26 and 36, such that a portion of the respective wheels 62, 66, 72 and 76 are received therein, to thereby cradle and prevent the drum 20 from laterally displacing or falling from the support assembly 50. For example, the wheel 62 is shown to include a driving surface 63 and a sidewall surface 64 which can be generally perpendicular to the driving surface 63; the wheel 66 is shown to include a driving surface 67 and a sidewall surface 68 which can be generally perpendicular to the driving surface 67; the wheel 72 is shown to include a driving surface 73 and a sidewall surface 74 which can be generally perpendicular to the driving surface 73; and the wheel 76 is shown to include a driving surface 77 and a sidewall surface 78 which can be generally perpendicular to the driving surface 77. In one configuration, as will be appreciated with respect to FIGS. 1-4, the driving surfaces 63 and 67 of the respective wheels 62 and 66 can contact the first bearing surface 28, such that the sidewall surfaces 64 and 68 are adjacent to the first ridge 29; while the driving surfaces 73 and 77 of the respective wheels 72 and 76 can contact the second bearing surface 38, such that the sidewall surfaces 74 and 78 are adjacent to the second ridge 37. While only one sidewall surface of each of the wheels has been specifically labelled, it will be appreciated that opposite sidewall surfaces of each of the wheels can similarly be adjacent to the other ridges 27 and 39 of the corresponding channels 26 and 36 of the drum 20 to further assist in constraint of the drum 20 relative to the support assembly 50. While the channels 26 and 38 are shown to comprise C-type or U-type channels, it will be appreciated that in alternative embodiments, channels of a drum can be provided in any of a variety of other suitable configurations (e.g., L-type or I-type).

The support assembly 50 is shown in FIG. 2 to include an electric motor 52 which is configured to be coupled with the wheel 72 by a gearbox 54. A variable frequency drive 56 can be coupled with the electric motor 52 and configured to operate the electric motor 52 at variable speeds as may be desired in accordance with the present disclosure. In an alternative embodiment, an electric motor can be coupled with more than one wheel of a support assembly, more than one electric motor can be employed in association with a support assembly, and/or a non-electric (e.g., hydraulic) motor can alternatively employed. It will be appreciated that, in addition to or in lieu of a gearbox, a belt or chain can be provided to couple a motor to one or more wheels of a support assembly.

A rotational test apparatus can further include one or more obstacles that can be selectively secured within an interior compartment of a drum. For example, as will be appreciated with reference to the example of FIGS. 2-3, the drum 20 can be fitted with four respective obstacles. More particularly, a first obstacle 90 is shown to be in the shape of a ramp and can be disposed within the interior compartment 49 and secured to the side wall section 44 of the side wall 40 with bolts threaded into threaded apertures in the side wall section 44. A second obstacle 92 is shown to be in the shape of a bump and can be disposed within the interior compartment 49 and secured to the side wall section 44 of the side wall 40 with one or more other bolts threaded into threaded apertures in the side wall section 44. A third obstacle 94 is also shown to be in the shape of a bump and can be disposed within the interior compartment 49 and secured to the side wall section 44 of the side wall 40 with one or more other bolts threaded into threaded apertures in the side wall section 44. A fourth obstacle is also shown to comprise an adjustable shelf assembly 80 which can be disposed within the interior compartment 49 and secured to the side wall section 45 of the side wall 40 with one or more other bolts (e.g., 98) threaded into threaded apertures in the side wall section 45. It will be appreciated that, in an alternative embodiment, a single obstacle (e.g., a bump, shelf, or adjustable shelf) can be simultaneously secured to multiple side wall sections of a side wall. It can be seen that each of the first obstacle 90, the second obstacle 92, the third obstacle 94 and the fourth obstacle can be spaced from another.

Selection and placement of obstacles within an interior compartment of a drum can be carefully selected to achieve a desired effect upon one or more packages disposed within the interior compartment during rotation of the drum. Obstacles can be provided in similar or differing shapes and can be attached to a side wall at any of a variety of suitable locations. For example, while the rotational test apparatus 10 is shown to include four obstacles, it will be appreciated that an alternative rotational test apparatus can include fewer than four obstacles or more than four obstacles. Additionally, while all of the obstacles of the rotational test apparatus 10 are shown to be attached to two of the side wall sections which are adjacent to one another (namely 44 and 45), it will be appreciated that obstacles of an alternative rotational test apparatus can otherwise be attached to only a single side wall section, to two of the side wall sections which are not adjacent to one another, or to more than two of the side wall sections. Also, while some or all of the obstacles within an interior compartment can be identical to one another (e.g., in the case of FIGS. 2-3, the second obstacle 92 and the third obstacle 94), it will be appreciated that, in other embodiments, each obstacle within an interior compartment can be differently configured in terms of size and/or shape. It will be appreciated that use of the side wall 40 having flat side wall sections (e.g., 41, 42, 43, 44, 45 and 46 of FIG. 2) can facilitate greater ease and versatility in attachment of obstacles than might be achievable through use of a rounded side wall (e.g., 140 of FIG. 5).

Figure 3:
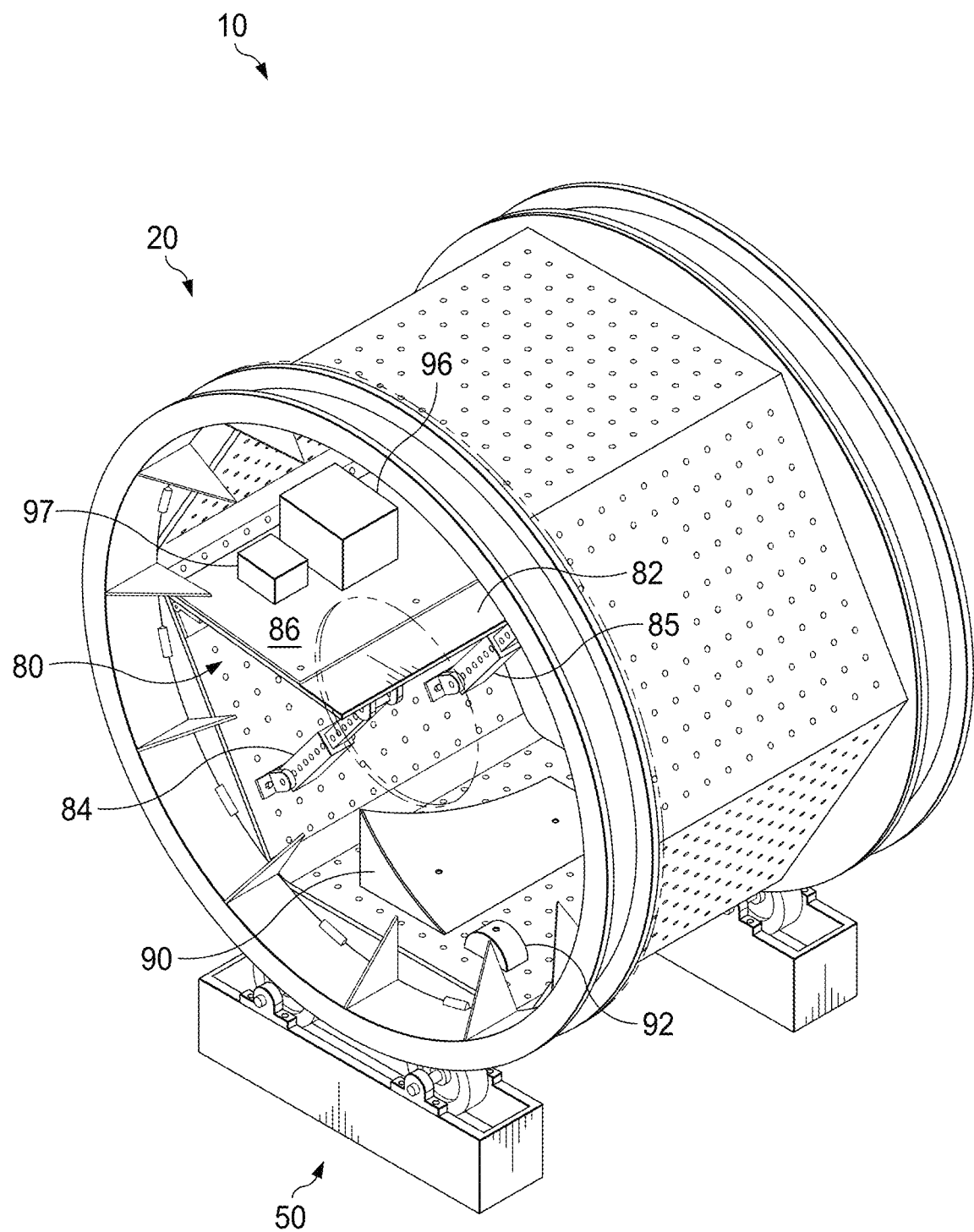
FIG. 3 is a perspective view depicting the rotational test apparatus of FIG. 1, but with a side wall being transparent for clarity of illustration, and with a plurality of packages provided within an interior compartment thereof.
Figure 4:
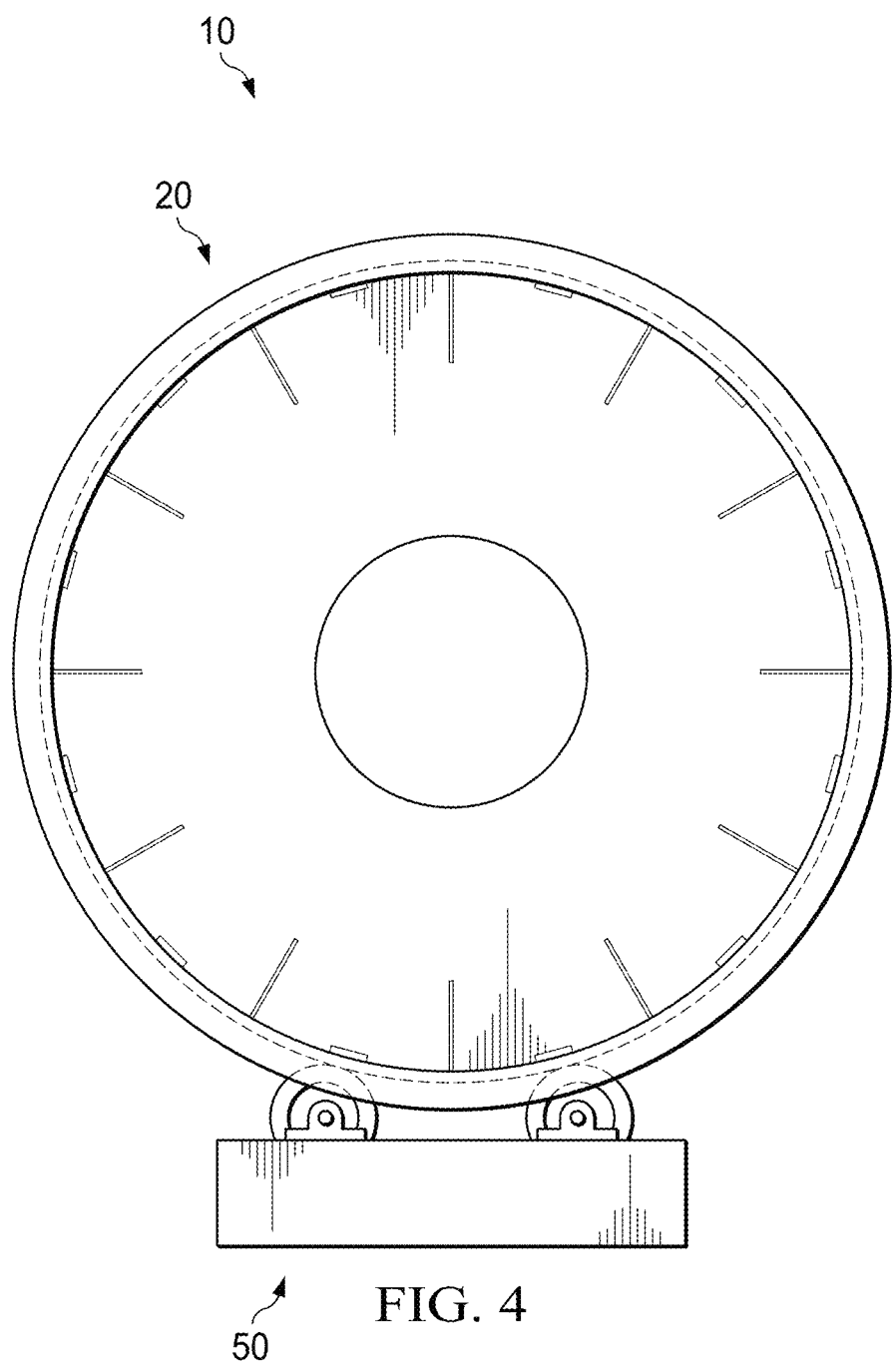
FIG. 4 is a side elevational view depicting the rotational test apparatus of FIG. 1.

Referring back to the fourth obstacle, the adjustable shelf assembly 80 is shown in FIGS. 1-3 to include a rigid shelf 82 extending longitudinally from a proximal end to a distal end, and extending laterally at least partially between the first end wall 22 and the second end wall 32. A hinge 83 is shown to hingedly couple the proximal end of the rigid shelf 82 to the side wall section 45, in particular with bolts attaching the hinge 83 to the side wall section 45 and extending into threaded apertures in the side wall section 45. First and second stanchions 84 and 85 are shown, with each extending from a respective first end to a respective second end. The first end of each stanchion 84 and 85 can be coupled to the side wall section 45 with bolts threaded into select ones of the threaded apertures in the side wall section 45. The second end of each stanchion 84 and 85 can be coupled with the rigid shelf 82 adjacent to the distal end of the rigid shelf 82. By adjusting the height of the stanchions 84 and 85, the angle of the rigid shelf 82 relative to the side wall section 45 can be adjusted. Clevis pins or other suitable fasteners can be employed to facilitate maintenance of the stanchions 84 and 85 at desired heights. While the adjustable shelf assembly 80 is shown to comprise two stanchions (84 and 85), it will be appreciated that an adjustable shelf assembly can otherwise include only a single stanchion, more than two stanchions, and/or any of a variety of other suitable mechanical configurations configured to facilitate adjustability thereof. In still other embodiments, an obstacle within an interior compartment of a drum can comprise a non-adjustable or fixed shelf.

The adjustable shelf assembly 80 is shown to further comprise a flexible sheet 86 overlying at least part of the rigid shelf 82 and extending longitudinally from a proximal end to a distal end and extending laterally at least partially between the first end wall 22 and the second end wall 32. In one embodiment, the flexible sheet 86 can be attached (e.g., with bolts) to the rigid shelf 82. However, in another embodiment, the proximal end of the flexible sheet can be separately coupled to the side wall with bolts inserted into threaded apertures in the side wall, with the remainder of the flexible sheet being unattached to anything. In this latter configuration, the flexible sheet can loosely drape over a portion of an associated rigid shelf, thereby serving to ease a transition from the side wall to the rigid shelf. In one embodiment, the flexible sheet 86 can be formed from plastic (e.g., HDPE) or another suitable material to reduce or otherwise control an amount of friction imparted upon a package by the adjustable shelf assembly 80.

It will therefore be appreciated that, by having one or more obstacles installed within an interior compartment of a drum, a first plurality of threaded apertures of the drum can be occupied by bolts to facilitate such installation. However, a second plurality of the threaded apertures of the drum can remain unoccupied. The second plurality can exceed the first plurality so as to allow for repositioning, replacement or addition of obstacles. In one embodiment, the second plurality can exceed the first plurality by at least a ratio of 10 to 1. In another embodiment, the second plurality can exceed the first plurality by at least a ratio of 25 to 1. In yet another embodiment, the second plurality can exceed the first plurality by at least a ratio of 50 to 1. In still another embodiment, the second plurality can exceed the first plurality by at least a ratio of 100 to 1. In another embodiment, the second plurality can exceed the first plurality by at least a ratio of 1000 to 1. In lieu of threaded bolts provided into threaded apertures of a drum, it will be appreciated that a rotational test apparatus can instead include non-threaded apertures of a drum that are adapted to receive bolts with nuts, rivets, bayonet-type fasteners, or any of a variety of other suitable types of fasteners.

Figure 5:
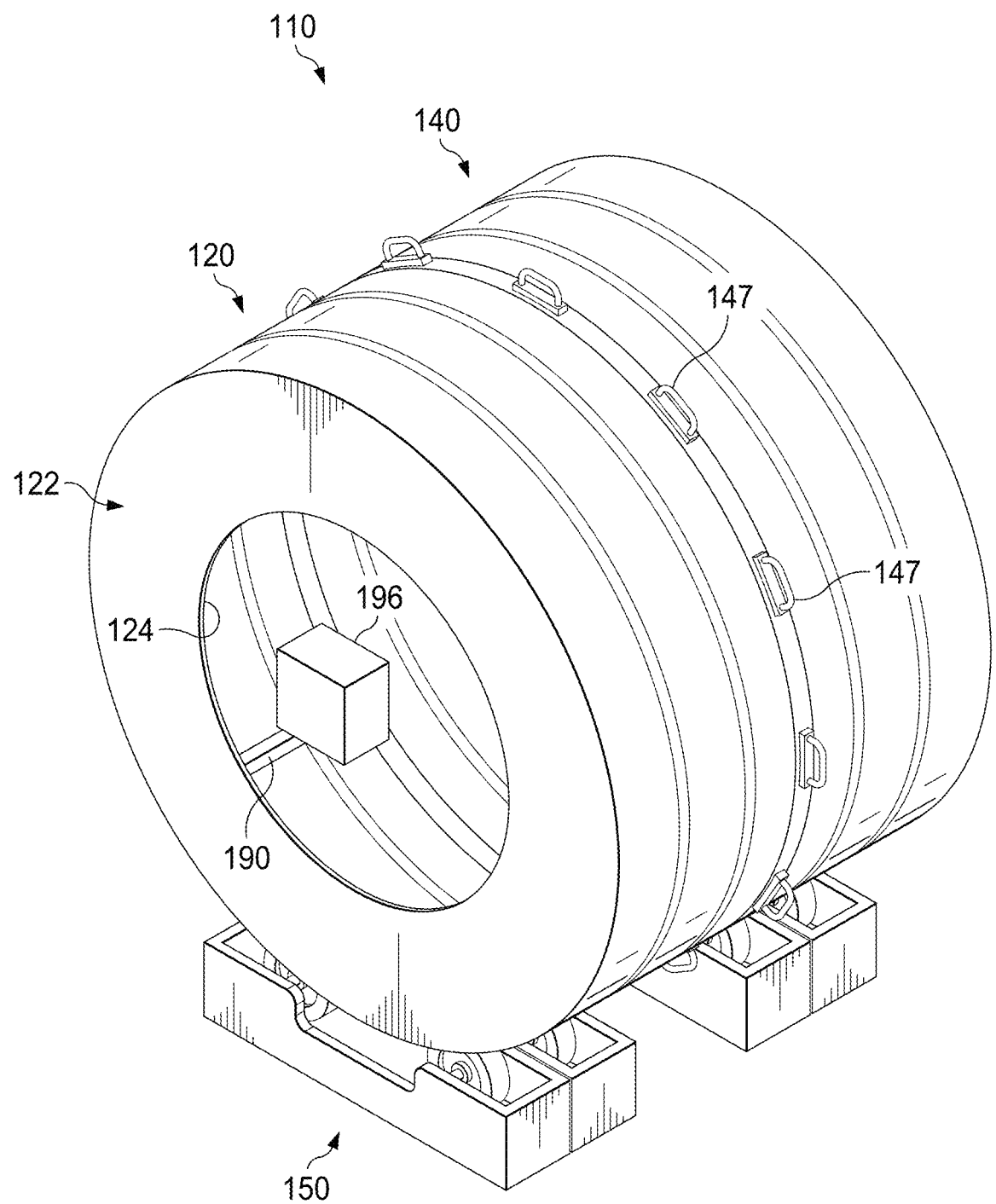
FIG. 5 is a perspective view depicting a rotational test apparatus in accordance with another embodiment, wherein a package is provided within an interior compartment thereof.

In other embodiments, a rotational test apparatus can include fewer or greater than six side walls to define a shape other than a hexagonal shape. For example, as shown in the example of FIG. 5, a rotational test apparatus 110 can include a drum 120 rotatably supported by a support assembly 150. The drum 120 is shown to have a side wall 140 that is generally round and in a cylindrical shape, though in certain other ways can be similar to the drum 40 of FIGS. 1-4. For example, the drum 120 is shown in FIG. 5 to include an end wall 122 defining a passageway 124 and further to include an obstacle 190 attached to an inner surface of the side wall 140. A package 196 is shown in FIG. 5 to be contacting the obstacle 190. A plurality of handles (e.g., 147 in FIG. 5) are shown to be attached to an exterior surface of the side wall 140 and generally evenly spaced about a circumference of the drum 120, to facilitate ease of manual rotation of the drum 120 by a user.

With respect to either of the rotational test apparatus 10 or 110, it will be appreciated that the quantity, size, and location of obstacles can be determined based upon a desired force profile to be imparted upon a package disposed within the interior compartment of the drum. Further, it will be appreciated that the drum can be rotated either manually (e.g., by hand through use of handles such as 147) or automatically (through use of an electric or other motor coupled to one or more wheels of a support assembly, as will be appreciated with reference to FIG. 2). With the obstacles appropriately selected and placed, and with the drum rotated at an appropriate speed (e.g., from about 1 RPM to about 5 RPM), it will be appreciated that the rotational test apparatus can provide a loading profile to a package within the drum that matches or is similar to that which would be experienced by the package if passing through a warehouse. The rotational speed of the drum can be selected based upon the size and configuration of the packages to be tested, the size of the drum, the ratio thereof, and the desired impact profile.

One example of a method of use will now be described. The first step of such a method of use can be to determine an actual loading profile of a particular package within a particular warehouse. To do so, a test package can be fitted with at least one sensor and a data acquisition unit coupled with the sensor. The test package can be conveyed through an actual warehouse, while using the sensor within the test package to detect dynamic loading experienced by the test package during its conveyance through the warehouse. In one embodiment, the sensor can include a triaxial accelerometer configured to detect position and orientation experienced by the test package during its conveyance through the warehouse. The data acquisition unit can capture data associated with the sensor readings, and the data can then be interpreted to identify the actual loading profile. In one embodiment, the actual loading profile can include correlating the detected dynamic loading with the detected position and orientation of the test package.

The second step of the method of use can be to operate a rotational test apparatus (e.g., 10 in FIG. 1) by securing at least one obstacle (e.g., 90) within an interior compartment (e.g., 49) defined by a drum (e.g., 20) of the rotational test apparatus. One or more proposed packages (e.g., 96 and 97) can then be inserted through a passageway (e.g., 24) into the interior compartment. The drum can then be rotated at a desired speed, such as through operation of a motor (e.g., electric motor 52). The operator can carefully select the speed of rotation of the drum, as well as the quantity, size, and location of each obstacle, such that the rotational test apparatus imparts a desired simulated loading profile onto the proposed package(s) (e.g., 96 and 97). In one embodiment, the simulated loading profile can approximate the actual loading profile such that, for example, each of the simulated loading profile and the actual loading profile provides a similar distribution and magnitude of maximum accelerations to the test package and the proposed package(s), respectively.

Following completion of the testing of the proposed package(s) (e.g., 96 and 97), the proposed package(s) can be removed from the interior compartment of the drum. After physically inspecting the proposed package(s), their contents, and any data associated therewith (if fitted with integral sensor(s) and data acquisition), an operator can determine if the proposed package(s) delivered acceptable performance. If not, the operator can reconfigure at least one physical characteristic of the proposed package(s), resulting in reconfigured proposed package(s). An operator can then reintroduce the reconfigured proposed package(s) into the interior compartment of the drum, and repeat rotation and testing with the rotational test apparatus. In one embodiment, this repeated rotation and testing can be accomplished without reconfiguring the rotational test apparatus, and simply by inserting the reconfigured proposed package into the interior compartment and rotating the drum at the earlier speed. The operator can then determine if the reconfigured proposed package(s) delivered acceptable performance. If not, these steps can be repeated until acceptable results have been achieved.

In one embodiment, the above-described second step of the method of use can involve developing the simulated loading profile based at least partially upon a signature of the warehouse. The signature of the warehouse can be created, at least in part, based upon a plurality of associations of different actual loading profiles with respective characteristic profiles of different test packages conveyed through the warehouse. The characteristic profile of a test package can be identified based at least in part upon a type, a size, a shape, a dunnage, a weight, and a weight distribution of the test package, and/or one, two, or three of the these and/or other characteristics. Or, more simply stated, following conveying of a suitable number of test packages through a warehouse, a pattern or signature of the warehouse can be identified. With that signature, a rotational test apparatus can be effectively configured (through obstacle selection and placement and through selection of speed) to effectively mimic the dynamic loading of that warehouse. The greater the number and varying characteristic profiles of such test packages, the more likely that the signature and associated configuration of the rotational test apparatus will effectively mimic the dynamic loading of the warehouse for a new proposed test package having a new (as-of-yet-untested) characteristic profile.

Figure 6A:
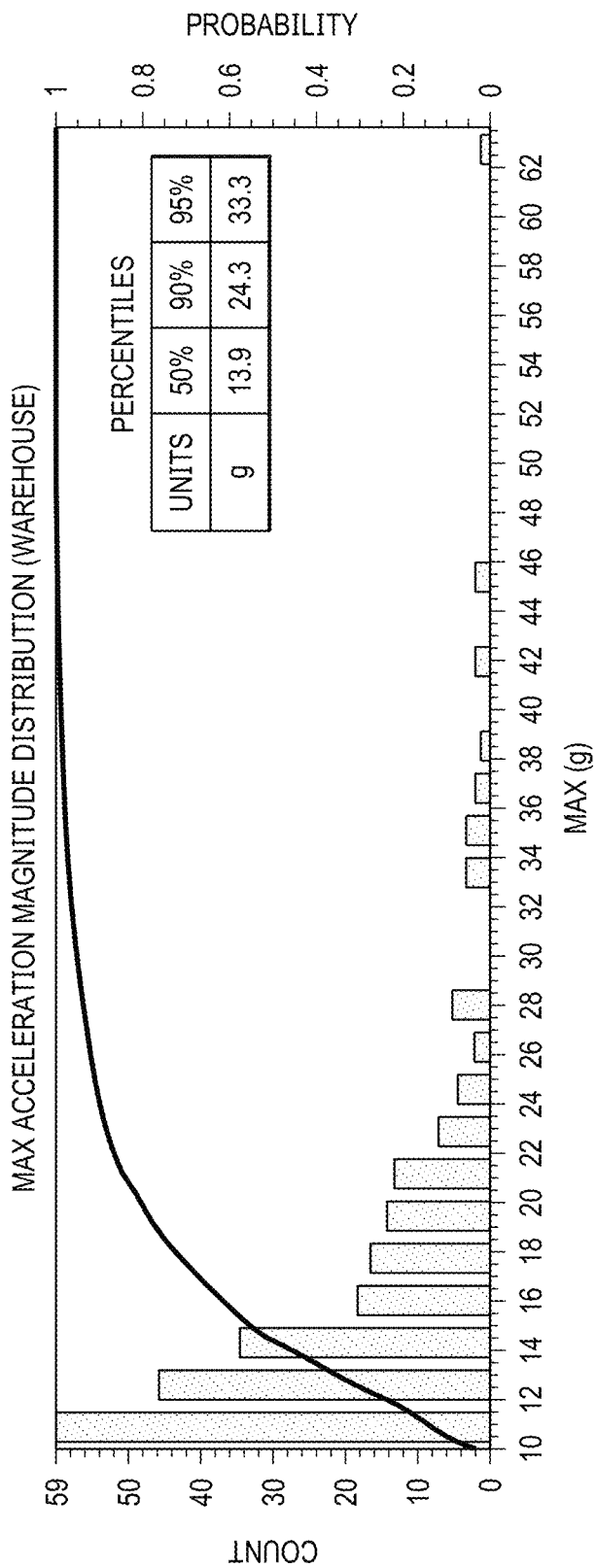
FIG. 6A is a chart depicting an example of distribution of magnitude of maximum acceleration experienced by a package conveyed through a warehouse.
Figure 6B:
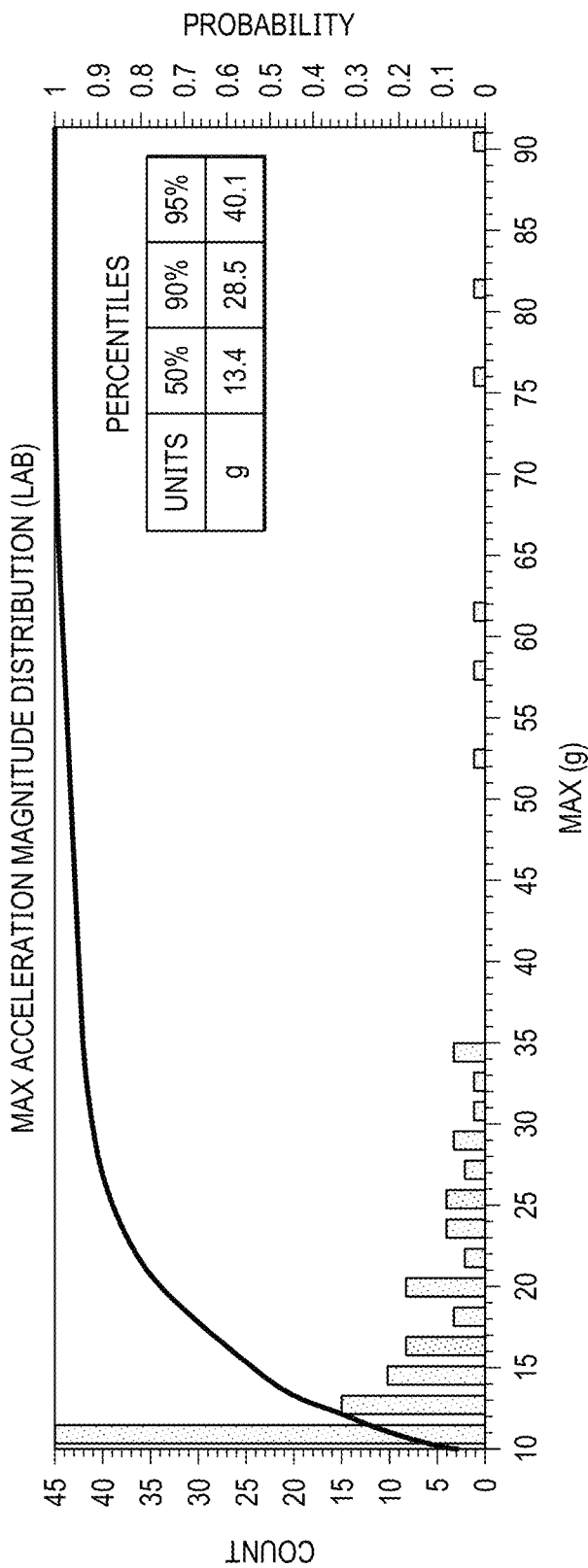
FIG. 6B is a chart depicting an example of distribution of magnitude of maximum acceleration experienced by the package of FIG. 6A when introduced to a rotational test apparatus in accordance with one embodiment.
Figure 7:
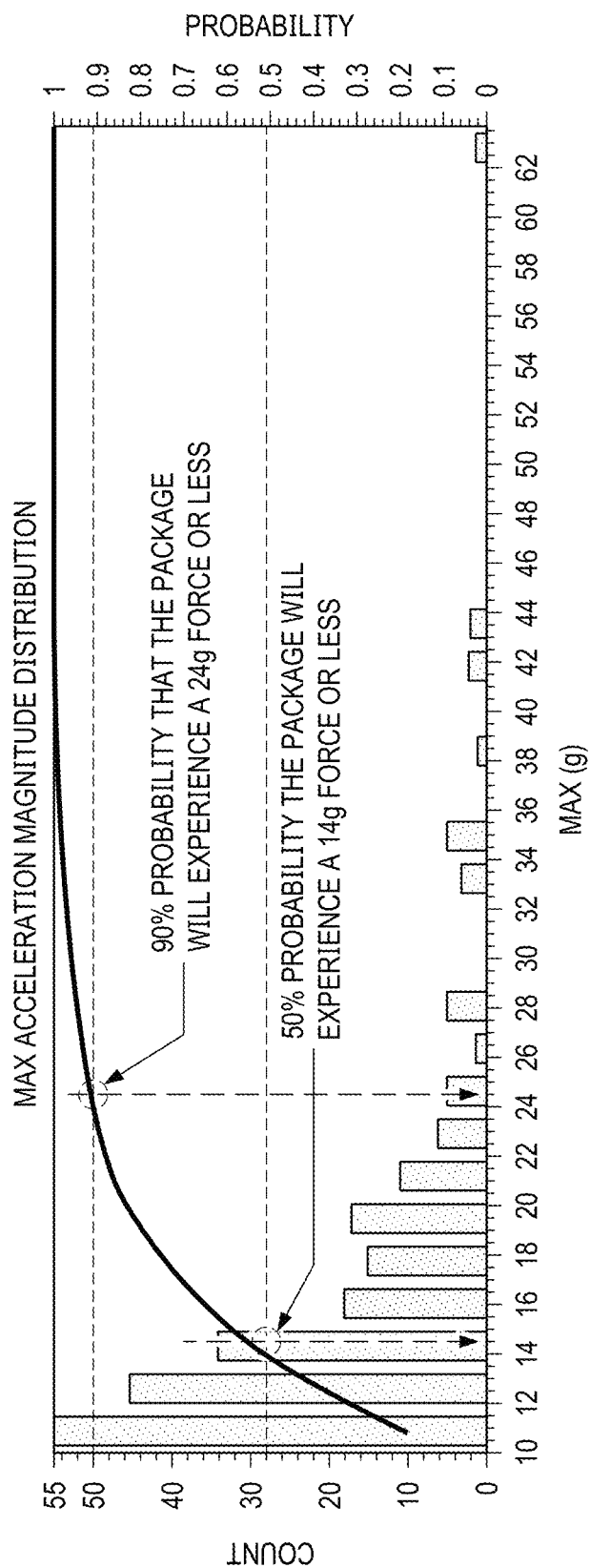
FIG. 7 is a chart providing illustration and explanation of certain data reflected in the charts of FIGS. 6A and 6B.

A rotational test apparatus as described herein can accordingly recreate package loading situations that are similar to those that would be experienced through the transitions, tumbles or impacts of the package in the warehouse. FIGS. 6A, 6B and 7 illustrate an example of such a result. FIG. 6A shows a distribution of magnitude of maximum acceleration experienced by a package when within a warehouse, while FIG. 6B shows a distribution of magnitude of maximum acceleration experienced by that package within the rotational test apparatus. FIG. 7 illustrates and explains the type of data reflected in the charts of FIGS. 6A and 6B. For example, Max Acceleration Magnitude Distribution can be determined as the number of times (counts) the package experiences a specific acceleration level.

In the example of FIGS. 1-4, the interior compartment 49 can measure about four feet wide and about eight feet tall, though it will be appreciated that any of a variety of other suitable sizes can be employed. If the diameter of the drum is too small relative to the size of the packages to be tested, excessive tumbling of the packages may occur within the drum. It is generally better for the drum to have a larger diameter versus a smaller diameter, because as the diameter of the drum increases, the curvature of the drum becomes less significant relative to the packages within the drum, and the packages are less likely to unintentionally tumble within the drum.

Depending upon the configuration of obstacles within the drum, a rotational test apparatus may or may not cause the package to tumble. For example, tumbling of a package within a rotational test apparatus can be designed to occur if needed to simulate a condition actually experienced by the package in the warehouse, but needn't otherwise occur. In many cases, tumbling or mere tumbling of a package is not well suited to replicating the types of impacts that tend to occur to the edges and corners of a package in a warehouse. Rather, the features of the presently disclosed rotational test apparatus can be configured to more closely resemble and deliver the types of impact loading to a package that it would actually experience when passing through the conveyance systems of a warehouse, and thus to enable realistic packaging development and testing to occur offline in the laboratory. More particularly, rather than merely tumbling a package, in the configuration described herein, a rotational test apparatus can impart controlled rectilinear motion upon a package. It will be appreciated that the rotational test apparatus can be effectively used with packages of many types and configurations including, for example, cardboard boxes, mailers, and envelopes.

As will be appreciated in view of the above, once a rotational test apparatus is configured to reasonably simulate impacts that would occur within a warehouse, packages can then be tested in the rotational test apparatus instead of in the warehouse, thus saving valuable time and resources. Testing packages with the rotational test apparatus can contribute or lead to a comprehensive understanding of package-dunnage roles in single or multi product ecommerce orders. More particularly, the types, sizes and configurations of packaging materials and dunnages can be investigated on a case-by-case basis, and with specificity by a particular warehouse, while taking into account factors such as co-packaging opportunities, cost efficiency, and environmental sustainability.

The present application hereby incorporates by reference, in its entirety, U.S. patent application Ser. No. 18/373,326, which was filed on Sep. 27, 2023. The present application additionally hereby incorporates by reference, in its entirety, U.S. Pat. App. Ser. No. 63/585,688, which was filed on Sep. 27, 2023. It will be appreciated that any of the concepts from either or both of these patent applications can be employed to facilitate design, construction and selection of packages for use in a rotational test apparatus or as a result of testing of a package in a rotational test apparatus, in accordance with the teachings herein.

Any element expressed herein as a means for performing a specified function is intended to encompass any way of performing that function including, for example, a combination of elements that performs that function. Furthermore, the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. Anon-transitory computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations. It can be appreciated that the examples are intended primarily for purposes of illustration for those skilled in the art. No particular aspect or aspects of the examples are necessarily intended to limit the scope of the present disclosure. For example, no particular aspect or aspects of the examples of system architectures, table layouts, or report formats described herein are necessarily intended to limit the scope of the disclosure.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

The apparatus and methods can include one or more processors and one or more memory units and can, in particular, be facilitated through use of any suitable processor-based device or system, such as a personal computer, laptop, server, mainframe, mobile computer, other processor-based device, or a collection (e.g. network) of multiple computers, for example. The processor can execute software instructions stored on the memory unit(s). The processor can be implemented as an integrated circuit (IC) having one or multiple cores. The memory unit(s) can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs. The memory unit can store executable software and data. When the processor executes the software instructions of various modules, the processor can be caused to perform the various operations of the apparatus and methods, such as described herein.

The apparatus and methods can store and access data in a variety of databases. The data stored in the databases can be stored in a non-volatile computer memory, such as a hard disk drive, read only memory (e.g. a ROM IC), or other types of non-volatile memory. In some embodiments, one or more of the databases can be stored on a remote electronic computer system and can be accessed via a network. As will be appreciated, a variety of other databases or other types of memory storage structures can be utilized or otherwise associated with the apparatus and methods.

The apparatus and methods can include one or more computer servers, which can include one or more web servers, one or more application servers, and/or other types of servers. The servers can cause content to be sent between or among monitored equipment, one or more dedicated communication hubs, smartphones, and/or remote computing devices, via a network in any of a number of formats. The servers can be comprised of processors (e.g. CPUs), memory units (e.g. RAM, ROM), non-volatile storage systems (e.g. hard disk drive systems), and other elements. The servers can use one or more operating systems including, but not limited to, Solaris, Linux, Windows Server, or other server operating systems.

In some embodiments, a web server can provide a graphical web user interface through which, for example, various users can visualize data captured by the monitored equipment. The graphical web user interface can also be referred to as a graphical user interface, user portal, user interface, graphical client interface, and so forth. The web server can accept requests, such as HTTP requests, from clients and serve the client's responses, such as HTTP responses, along with optional data content, such as web pages (e.g. HTML documents) and linked objects (such as images, video, documents, data, and so forth). The application server can provide a user interface for users who do not use a web browser to view data captured by the monitored equipment. Such users can have special software installed on their computing device to allow the user to communicate with the application server via a network.

In various embodiments, the apparatus and methods described herein may be configured and/or programmed to include one or more of the above-described electronic, computer-based elements and components. In addition, these elements and components may be particularly configured to execute the various rules, algorithms, programs, processes, and method steps described herein.

The description of embodiments and examples has been presented for purposes of illustration and description. It is not intended to be exhaustive or limiting to the forms described. Numerous modifications are possible in light of the teachings herein. Some of those modifications have been discussed, and others will be understood by those skilled in the art. The embodiments were chosen and described in order to illustrate principles of various embodiments as are suited to particular uses contemplated. The scope is, of course, not limited to the examples set forth herein, but can be employed in any number of applications and equivalent devices by those of ordinary skill in the art.

What is claimed is:

1. A rotational test apparatus comprising:
a support assembly;
a plurality of bolts;
a first obstacle; and
a drum rotatably supported by the support assembly, wherein the drum comprises:
a first end wall defining a first passageway;
a second end wall; and
a side wall defining a plurality of threaded apertures, wherein a first plurality of the threaded apertures is occupied by said bolts, a second plurality of the threaded apertures is unoccupied, and the second plurality exceeds the first plurality by at least a ratio of 10 to 1;
wherein
the first end wall, the second end wall and the side wall cooperate to define an interior compartment;
the first passageway extends into the interior compartment and is sized to facilitate selective insertion and removal of packages therethrough; and
the first obstacle is disposed within the interior compartment and secured to the side wall with at least some of said bolts threaded into respective ones of the first plurality of the threaded apertures.

2. The rotational test apparatus of claim 1 wherein:
the side wall comprises a plurality of side wall sections; and
each of the side wall sections is generally planar, extends from the first end wall to the second end wall, and abuts adjacent ones of the side wall sections.

3. The rotational test apparatus of claim 2 wherein each of the side wall sections:
is identical to all of other ones of the side wall sections; and
comprises a flat sheet of ¼" steel plate material.

4. The rotational test apparatus of claim 1 wherein:
the side wall comprises six side wall sections; and
each of the side wall sections abuts adjacent ones of the side wall sections to define a hexagonal shape.

5. The rotational test apparatus of claim 1 wherein:
the first end wall defines a first bearing surface extending along an exterior of the drum adjacent to an outermost perimeter of the first end wall;
the second end wall defines a second bearing surface extending along an exterior of the drum adjacent to an outermost perimeter of the second end wall;
the support assembly comprises a first support assembly portion and a second support assembly portion;
the first support assembly portion comprises a first plurality of rotatable wheels each contacting the first bearing surface of the first end wall; and
the second support assembly portion comprises a second plurality of rotatable wheels each contacting the second bearing surface of the second end wall.

6. The rotational test apparatus of claim 5 wherein:
the first end wall defines a first ridge adjacent to the first bearing surface and being generally perpendicular to the first bearing surface;
the second end wall defines a second ridge adjacent to the second bearing surface and being generally perpendicular to the second bearing surface;
each of the first plurality of rotatable wheels comprises a first driving surface and a first sidewall surface, the first driving surface contacting the first bearing surface and being generally perpendicular to the first sidewall surface, and the first sidewall surface being adjacent to the first ridge; and
each of the second plurality of rotatable wheels comprises a second driving surface and a second sidewall surface, the second driving surface contacting the second bearing surface and being generally perpendicular to the second sidewall surface, and the second sidewall surface being adjacent to the second ridge.

7. The rotational test apparatus of claim 5 wherein the support assembly further comprises:
an electric motor coupled with at least one of the first plurality of rotatable wheels; and
a variable frequency drive coupled with the electric motor.

8. The rotational test apparatus of claim 1 wherein the first obstacle comprises an adjustable shelf assembly comprising:
a rigid shelf extending longitudinally from a proximal end to a distal end and extending laterally at least partially between the first end wall and the second end wall, the proximal end of the rigid shelf being hingedly coupled to the side wall with some of said bolts threaded into select ones of the first plurality of the threaded apertures; and
an adjustable stanchion extending from a first end to a second end, the first end being coupled to the side wall with some other of said bolts threaded into select other ones of the first plurality of the threaded apertures, and the second end being coupled with the rigid shelf adjacent to the distal end of the rigid shelf.

9. The rotational test apparatus of claim 8 wherein the adjustable shelf further comprises a flexible sheet overlying at least part of the rigid shelf and extending longitudinally from a proximal end to a distal end and extending laterally at least partially between the first end wall and the second end wall.

10. The rotational test apparatus of claim 1 further comprising:
- a second obstacle disposed within the interior compartment and secured to the side wall with others of said bolts threaded into select other ones of the first plurality of the threaded apertures, wherein the second obstacle is spaced from the first obstacle; and
- a third obstacle disposed within the interior compartment and secured to the side wall with others of said bolts threaded into select other ones of the first plurality of the threaded apertures, wherein the third obstacle is spaced from each of the first obstacle and the second obstacle.

11. The rotational test apparatus of claim 1 wherein the interior compartment measures about four feet wide and about eight feet tall.

12. The rotational test apparatus of claim 1 wherein the side wall has a cylindrical shape.

\* \* \* \* \*